July 8, 1924.
D. K. LIPPINCOTT
ELECTRIC CIRCUIT PROTECTIVE DEVICE
Filed July 8, 1919    2 Sheets-Sheet 2
1,501,018
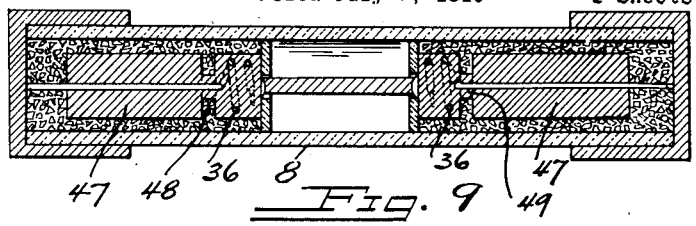
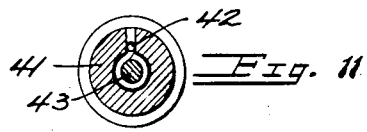
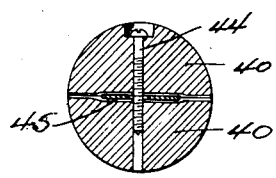
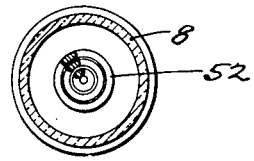
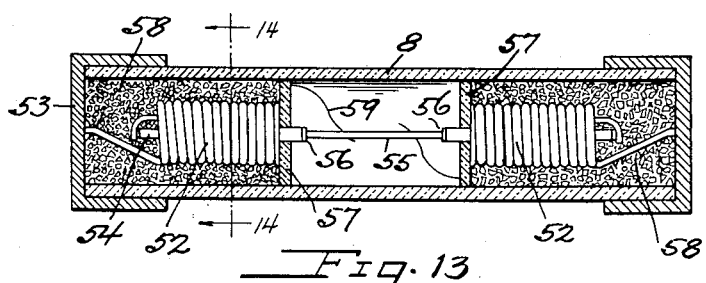
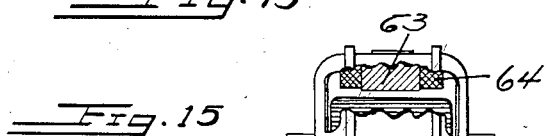
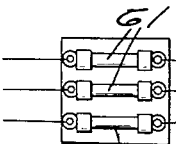
Witness
H. A. Sherburne.
INVENTOR.
D. K. LIPPINCOTT
BY White & Prost
his ATTORNEYS.

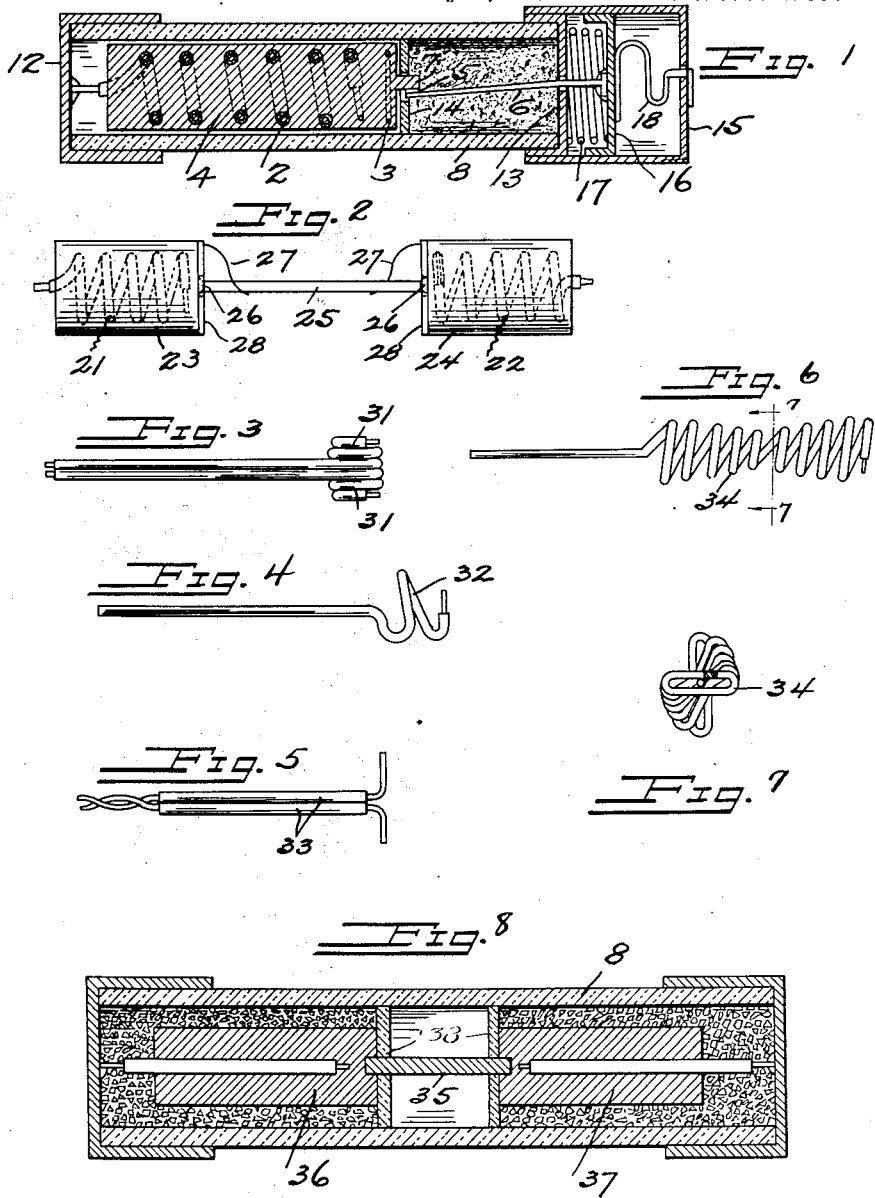

Patented July 8, 1924.

1,501,018

UNITED STATES PATENT OFFICE.

DONALD K. LIPPINCOTT, OF SAN FRANCISCO, CALIFORNIA, ASSIGNOR, BY MESNE ASSIGNMENTS, TO GENERAL ELECTRIC COMPANY, A CORPORATION OF NEW YORK.

ELECTRIC-CIRCUIT PROTECTIVE DEVICE.

Application filed July 8, 1919. Serial No. 309,358.

*To all whom it may concern:*

Be it known that I, DONALD K. LIPPINCOTT, a citizen of the United States, and a resident of the city and county of San Francisco, State of California, have invented certain new and useful Electric-Circuit Protective Devices, of which the following is a specification.

The invention relates to devices for opening an electric circuit containing electrical apparatus when the temperature of the apparatus approaches a dangerous value.

The devices of my invention are operated by an increase in temperature above a predetermined value, to open an electric circuit.

An object of the invention is to provide a device in which the temperature of the electrical apparatus is faithfully reproduced, so that any condition or series of conditions of current flow which will produce a dangerous temperature in the apparatus, will, in the same time, produce in the device a temperature which will cause it to operate to open the circuit.

Another object of the invention is to provide a protective device comprising a fusible member which will be subjected to the temperatures obtaining in the apparatus.

A further object of the invention is to provide a protective device having a heat ballast or heat storage capacity, corresponding to the heat ballast of the apparatus.

A further object of the invention is to provide a protective device having a heat ballast and a heating element in such relationship that the temperature of a portion of the ballast corresponding directly and at all times with the temperature of the hottest destructible portion of the apparatus being protected.

A further object of the invention is to provide a protective device wherein the heat generation, heat storage and heat emission are independent and may be separately determined by the designer.

The invention possesses other advantageous features, some of which, with the foregoing, will be set forth at length in the following description, where I shall outline in full, those forms of the invention which I have selected for illustration in the drawings accompanying and forming part of the present specification. In said drawings, I have shown several specific forms of the protective device of my invention, but it is to be understood that I do not limit myself to such forms, since the invention, as expressed in the claims, may be embodied in a plurality of forms.

The protective device of my invention, when operating, that is, when current is flowing in the circuit, is substantially synthermal with the apparatus being protected. Since the device and apparatus are synthermal or substantially so, a dangerous temperature in the apparatus will be accompanied by a corresponding temperature in the device, and this temperature will actuate the device, to open the circuit, thereby precluding any further current flow. By a dangerous temperature, I do not mean a destructive temperature, but rather, any temperature beyond which the continued safe operation of the apparatus is not assured. By virtue of this synthermal relationship which obtains at all times during the operation of the apparatus, it is possible to operate the apparatus on overloads of large or small magnitude, with the assurance that the apparatus will carry the overload for the maximum possible period and that the circuit will be open in advance of the production of a destructive temperature in the apparatus. This not only eliminates the necessity for two sets of protective devices, such as starting fuses and running fuses, but permits the operator to operate his apparatus at its maximum capacity, without fear of burn-outs and the consequent cost of idle equipment and repairs.

I have found that three factors enter into the equation which determines the temperature produced in electrical apparatus, these factors being, heat generation, heat storage and heat emission, and these three factors must be of the same relative magnitude to produce the synthermal relation. Heat is generated by the flow of current through a resistance, heat is stored in any material whose temperature is raised, the magnitude of the storage capacity being represented by the product of the mass, and the specific heat of the material, and heat is emitted by conduction, convection and radiation. When the temperature of a particular spot in the apparatus being protected is considered, in contradistinction to the mean temperature, a fourth factor must be taken into account, i. e., the flow of heat between the different parts of the device. The rate of heat emission may be regulated by varying surface dimensions and by the use of heat insulation materials. The apparatus being protected, whether it be a motor, a transformer or other apparatus, contains material which possesses heat storage capacity and to produce a synthermal or substantially synthermal protective device, provision must be made in the device for heat storage.

Under certain conditions, the resistance element or heating element in the device may be so formed that it serves as a heat storage element. Under other conditions, the heat storage may be represented by the resistance element and the thermal responsive element. In practice, however, there is considerable advantage to be gained by the use of material whose sole function is to act as heat storage or heat ballast. The ballast receives its heat preferably by conduction from the resistance or heating element and I have so arranged the ballast with relation to the heating element, that the temperature to which the heat responsive device is subjected corresponds directly with or is the same as the temperature which is produced in the hottest part of the destructible portion of the apparatus, for instance, the temperature which is produced in the hottest part of the windings of a motor or transformer. Windings are subjected to different temperatures at different parts, due to the different rates of heat emissivity of the different parts and in order to protect the windings from burning out, it is necessary to control the temperature at the hottest part of the winding. To accomplish this, the heat flow within the apparatus is compensated for by the concentration or distribution of the heating element with respect to the thermal responsive element and the ballast.

The device shown in the drawings comprises a heating element, a heat storage element and a thermal responsive element which operates at a given temperature, to open the circuit, thereby precluding any further temperature rise of the apparatus. In the particular device shown, the thermal responsive element is a destructible element, comprising a fusible link or a fusible connection in the circuit, but it is to be understood that the invention is not limited to the use of a fusible element or a destructible element, since a non-destructible element such as a thermostat may be employed, the thermostat serving to close a circuit through electrically operated devices for opening a switch in the circuit or to directly operate the switch. An arrangement of this nature is shown in my copending application Serial No. 343,483, filed December 9, 1919.

Referring to the accompanying drawings:

Figure 1 is a longitudinal section of a fuse embodying my invention.

Figure 2 is an elevation of a modified form of fuse with the case removed.

Figs. 3 and 4 are elevations of heating elements for producing concentrated heating.

Figs. 5 and 6 are elevations of heating elements for producing distributed heating.

Fig. 7 is a cross section of the heating element, taken on the line 7—7, Fig. 6.

Fig. 8 is a longitudinal section of a modified form of fuse with the casing removed.

Fig. 9 is a longitudinal section of a modified form of fuse.

Fig. 10 is a plan view of a modified form of heat storage element.

Fig. 11 is a cross section of the element taken on the line 11—11, Fig. 10.

Fig. 12 is a cross section of another modified form of heat storage element.

Fig. 13 is a longitudinal section of a fuse in which the heating element also serves as a heat storage element.

Fig. 14 is a cross section taken on the line 14—14, Fig. 13.

Fig. 15 is a diagrammatic representation of one form of electric circuit containing electrical apparatus, showing devices of my invention arranged therein.

Different types of electrical apparatus and different species and makes of apparatus of the same type have different heating characteristics and the devices of my invention are constructed so that they are synthermal or substantially synthermal with the apparatus. In some devices the heating element is arranged so that the heating is concentrated with respect to the ballast, the degrees of concentration varying, and in others, the heating is distributed in different degrees. Such arrangements cause the device to heat synthermally with the apparatus under conditions of ordinary running, small overloads, heavy overloads and varying conditions of load.

The device comprises, generally, a heating element a storage element, and a thermal responsive element, and, under certain conditions, the heating element and the heat storage element may be combined into one element. In the device shown in Fig. 1, the heating element, which consists of a coil of insulated wire 2 having a bare end 3, is embedded in a metallic block 4, which comprises the heat storage element. The heating coil is evenly distributed throughout the block 4, so that the heat storage element is uniformly heated. The block 4 is preferably cast around the heating coil, so that it makes close thermal contact therewith, and the metal or alloy of the block is so chosen that the desired specific heat thereof is obtained. Attached to one end of the block is a thermal responsive device, comprising a fusible metallic drop or link 5, in this instance comprising a drop of solder, and secured to the element 5 is a metallic strip 6, fusible at a higher temperature than the element 5. The metallic strip 6 also acts as a heating element to heat thermal responsive element, so that it has the same temperature as the hot-spot in the apparatus being protected. More specifically, the block 4 is provided with a projection 7 to which the strip 6 is attached by the fusible solder. The fuse is enclosed in a cartridge or casing 8 of heat insulating material, and the ends of the casing are closed by metallic ferrules 12 and 13. One end of the heating element 2 is connected to the ferrule 12. The projection 7 extends through an opening in the partition washer 14, preferably made of fiber, and the space within the casing in which the strip 6 is disposed is preferably filled with a suitable non-arcing or gas absorbing material. In this construction the strip 6 is so proportioned that it will fuse at its central portion in the same manner as the ordinary type of cartridge fuse, before the fusible solder can melt, when the current exceeds a certain value, thus protecting the apparatus and circuit from currents of high value such as occur on short circuiting.

In order that the circuit may be abruptly broken when the fusible solder melts, the strip 6 is placed under tension, whereby it springs rapidly away from the projection 7 to prevent the maintenance of an arc. Overlying and secured to the ferrule 13 is a ferrule or cap 15 which extends beyond the ferrule 13 forming a chamber between the ferrules. Disposed in this chamber is a flanged plate 16, to which the end of the strip 6 is secured, the strip passing through an opening in the ferrule 13. Interposed between the ferrule 13 and the plate 16, is a compression spring 17 which forces the plate away from the ferrule when the solder 5 is fused. The plate is positively electrically connected with the external ferrule by a flexible conductor such as a strip 18 of flexible copper.

The fuse is placed in suitable clips arranged in series in the circuit of the apparatus to be protected so that there is the same current flow through the fuse and through the apparatus. In two-wire systems, one or two fuses may be used, that is, one in each wire, and in three-wire systems, two or three fuses may be employed, although two are usually sufficient. The heat storage element or ballast 4 and the heating coil 2 are so proportioned with relation to the apparatus being protected, that regardless of load conditions, the temperature of the ballast or of the projection 7 is the same or substantially the same as that of the hottest part of the apparatus.

In Fig. 2 I have shown a construction in which two heating coils 21—22 and two heat storage elements 23—24 are employed. The two heat storage elements are connected by a drop-out link 25 through which the current flows, the link being connected to the heat storage elements by fusible solder 26. Both drops of solder will fuse at the same time and when this occurs, the link is thrown down by the fine springs 27, secured to the ballast and bearing against the link. To prevent the link, when thrown down, from closing the circuit between the two ballast elements, the adjacent ends of the ballast elements are covered with washers or discs 28 of insulating material. The fuse as shown is enclosed in a casing such as the casing 8, Fig. 1 and the chamber between the discs is usually left empty, to permit the link to readily drop out.

The heating curves of different apparatus are different and the device of my invention is designed to take care of these different heating characteristics of different apparatus. In some devices it is necessary that the heating element be concentrated, as is shown in Figs. 3 and 4, and in others it is necessary that it be distributed, as shown in Figs. 5, 6 and 7. Different degrees of concentration and distribution are required to produce devices which will have heating characteristics corresponding directly to different apparatus. In Fig. 3 I have shown a two-conductor heating element having tightly coiled ends 31 and in Fig. 4, the end 32 is less tightly coiled. These heating elements are embedded in the heat ballast at varying distances from the point of connection with the fusible element, thereby producing different heating characteristics. In Fig. 5 I have shown a distributed heating element formed of two parallel conductors 33 and in Figs. 6 and 7, a twisted flat coil 34, which produces a very uniform heating of the ballast. The coil is first formed flat, and is then twisted about its axis through an arc sufficient to give the desired distribution when embedded in the metallic heat ballast.

In Fig. 8 I have shown a modified form of fuse having a novel form of thermal responsive element, consisting of a eutectic alloy. The peculiarity of this element is that it passes from a solid state to a liquid state without softening or passing through a semi-solid state. Fusible elements which are gradually softened upon the application of heat, or which pass through a semi-solid state before reaching a liquid state, present several deleterious features in fuses of this nature. Such material, when heated to a temperature which approaches the fusing temperature of the metal, soften the metal sufficiently to produce a flow, thereby varying the cross-section of the metal and altering its current-carrying capacity. In operation, should this condition occur and the current drop before actual fusion of the metal, the rating of the fuse would be permanently altered, so that it would no longer offer the desired protection to the apparatus. By employing a eutectic alloy, the cross-section of the metal is not varied and its carrying capacity remains substantially the same after repeated heating to temperatures approaching the fusing temperature. Further, fusible elements which are gradually softened by the application of heat, when heated to a temperature which approaches the fusing temperature of the material, sag and permit the element to rest against the wall of the cartridge, so that the element is no longer a drop-out link. Further, by using a eutectic element, the circuit is broken at a definite temperature instead of at any indeterminate temperature within a certain range. Any suitable eutectic alloy may be used and the particular alloy employed will depend upon the temperature at which it is desired to have the alloy fuse. An alloy of lead 32%, tin 15.5% and bismuth 52.5% will fuse at 96° C.; an alloy of tin 34%, cadmium 27% and bismuth 39% will fuse at 103.7° C.; an alloy of lead 20%, cadmium 22% and tin 58% will fuse at 145° C. and an alloy of lead 37% and tin 63% will fuse at 182.5° C. The fusible element 35, which is a eutectic alloy, fusible at the required temperature, is firmly seated in the ends of the heat storage blocks 36—37 and the insulating washers 38 are employed to define a chamber for the collection of the fused metal. The enclosing casing 8 is, in this instance, larger in diameter than the heat storage blocks and the annular spaces between the blocks and the casing are filled with heat insulating material.

In those constructions of the fuse where a drop-out link is employed, or where solder is employed to secure a link in the circuit, I prefer to use a eutectic solder, since with such use the circuit is broken at a definite predetermined temperature.

In Figs. 10 and 11, I have shown a modified form of heat storage element, comprising a metallic cylinder 41 having a longitudinal groove cut therein in which the insulated wire or heating element 42 is disposed. The cylinder is bored at its end and the bared end of the wire is wrapped around a pin or plug 43 which is inserted in the bore. The cylinder may be of any suitable metal, such as iron. Fig. 12 shows a further modified form of heat storage element and heating element. The heat storage element comprises two cast semi-cylindrical metallic elements 40 secured together by the screw 44. Each element is provided on its flat surface with a shallow wide groove so that when placed together, a wide slot is obtained. The heating element consists of a flat strip of metal 45, preferably copper, disposed in the groove and separated from the blocks 40 by sheets of insulating material. The heating element is provided with a hole of larger diameter than the screw, so that the screw does not make electrical contact therewith. The strip of copper is preferably extended slightly from the block and the thermal responsive element is secured to the projecting end.

In Fig. 9, I have shown a modified form of fuse in which the concentration of the heating element with respect to the heat storage element is even more marked than in the previous constructions. This construction is particularly applicable to some types of motors which heat very rapidly when subjected to big current flow. The heating element 36 is concentrated in the end of the heat ballast element 47 to which the fusible solder is attached. Behind the heating element, the ballast is provided with a circumferential groove 48, leaving only a relatively narrow neck 49 connecting the two ends of the heat storage element. This neck regulates the heat conduction from the heated end of the ballast to the other end and under certain conditions causes the heated end of the ballast to rise to a much higher temperature than the other end. On low overloads, which cause the heated end of the ballast to heat slowly, heat is conducted through the neck, so that the temperature of the entire ballast varies practically simultaneously. On large overloads, the heated end of the ballast is heated at a higher rate than heat passes through the neck, with the result that the heated end rises in temperature much more rapidly than the remainder of the ballast. The effect is the same as if the physical dimensions of the ballast decreased for high current values while maintaining their full magnitude for small current values. This effect may be varied in different fuses by grooves of different depths and widths, and by placing heating coils in different positions, so that the heating curve of the motor may be followed to any desired degree of exactness.

In Figs. 13 and 14 I have shown a construction in which the heating element is so constructed that it serves also as the heat storage element. The heating coil 52 is formed of a plurality of helixes of different diameter, wound closely together, so that the effect of a mass of metal is produced. One end of the heating coil is connected to the ferrule 53 and the other end is connected to a conductor 54 passing axially through the coil, and to the other end of which a drop-out link 55 is connected by a drop of fusible solder 56. Insulation washers 57 surrounding the ends of the two conductors 54 hold the heat insulating material 58 in place and define the chamber in which the drop-out link is disposed. Springs 59 secured to the washers and engaging the link serve to throw it out of position to abruptly open the circuit as soon as the solder has fused.

In Fig. 15 I have shown a three-wire alternating current circuit with the protective devices 61 of my invention arranged therein. The apparatus being protected comprises an alternating current motor 62 which for convenience in description is shown as containing a field pole 63 and a field coil 64 surrounding the pole. On account of the difference in heat insulation of those turns of the field coil which lie within the coil and those which lie on the surface of the coil, where they are exposed to air currents, the temperature of the inner turns will be higher than the temperature of the outer turns, consequently, destructive temperatures will evidence themselves in the inner turns. The devices of my invention are constructed to be responsive to the temperatures obtaining in substantially the hottest portion or "hot spot" of the apparatus being protected.

I claim:

1. A protective device for an electric circuit containing electrical apparatus, comprising a heating element in circuit with the apparatus, a metallic heat storage element in which the heating element is embedded and with which it is in electrical contact and a thermal responsive device operative to open the circuit disposed in thermal communication with said metallic element.

2. A protective device for an electric circuit containing electrical apparatus, comprising a metallic heat storage element, an insulated heating element embedded in said storage element having a bare portion in electrical contact with said storage element, and a thermal responsive element operative to open the circuit disposed in thermal communication with said storage element.

3. In a protective device for an electric circuit containing electrical apparatus, a heating element in circuit with the apparatus, and a metallic heat storage element in which the heating element is embedded.

4. In a protective device for an electric circuit containing electrical apparatus, a heating element adapted to be connected in said circuit and to be heated by the current therein, a metallic heat storage element in which the heating element is embedded said storage element being proportioned so that the current in the heating element reproduces in the storage element the temperature conditions obtaining in substantially the hottest portion of said apparatus, and a thermal responsive device in thermal communication with said metallic element operative to preclude a further temperature rise above a predetermined value in said hottest portion.

5. A protective device for an electric circuit containing electrical apparatus, comprising a heating element in circuit with said apparatus, a fusible element in circuit with said heating element, and a metallic heat storage element in which said element is embedded.

6. A protective device for an electric circuit containing electrical apparatus, comprising a metallic heat storage element, a heating element in circuit with the apparatus embedded in said metallic element and electrically connected thereto, and a fusible element in said circuit electrically and thermally connected with said heat storage element.

7. A protective device for an electric circuit containing electrical apparatus, comprising a metallic heat storage element, a heating element in circuit with the apparatus embedded in said metallic element, and a fusible element in said circuit in thermal communication with said metallic element, melting of the fusible element serving to open the circuit.

8. A protective device for an electric circuit containing electrical apparatus, comprising a casing of insulating material, metallic contacts at the opposite ends of the casing, a heating element arranged in the casing and connected to one of said contacts, a metallic heat storage element in thermal communication with said heating element, an elongated fusible element disposed longitudinally in said casing and in said circuit in thermal communication with the heat storage element and connected to the other contact, and means for placing said fusible element under tension.

9. A protective device for an electric circuit containing electrical apparatus, comprising a casing of insulating material, metallic contacts at the opposite ends of the casing, a heating element arranged in the casing and connected to one of said contacts, a metallic heat storage element in thermal communication with the heating element, a fusible element in said circuit in thermal communication with the heat storage element, a spring pressed plate electrically connected to the other contact, and a conductor connecting the fusible element with the spring pressed plate.

10. A protective device for an electric circuit containing electrical apparatus comprising a heating element in circuit with the apparatus, a metallic heat storage element cast over and embedding said heating element and in electrical contact therewith, and a thermal responsive element in thermal communication with said heat storage element, an increase in temperature of the thermal responsive element to a predetermined temperature, serving to open the circuit.

11. A protective device for an electric circuit containing electrical apparatus, comprising a heat storage element, a heating element electrically and thermally connected to said heat storage element, a metallic strip in said circuit serving as a heating element, and a fusible element interposed between said strip and said heat storage element adapted to be heated by both the strip and the heat storage element.

12. A protective device for an electric circuit containing electrical apparatus comprising a metallic heat storage element, a heating element embedded in said heat storage element, the mass of the heat storage element being such that its mean temperature increases slowly with respect to increases in temperature of the heating element, and a thermal responsive heating element in said circuit and in thermal communication with said heat storage element and being arranged to be heated by current flow and by conduction from the heat storage element, the mass of said thermal responsive heating element being such that its temperature increases substantially concurrently with increases of current flow.

In testimony whereof, I have hereunto set my hand at San Francisco, California, this 25th day of June 1919.

DONALD K. LIPPINCOTT.

In presence of—
H. G. PROST.